US008543608B2

(12) United States Patent
Koul et al.

(10) Patent No.: US 8,543,608 B2
(45) Date of Patent: Sep. 24, 2013

(54) HANDLING OF EXPIRED WEB PAGES

(75) Inventors: Rohit Koul, Jammu (Tawi) (IN);
Gurudutta Ramanathaiah, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 452 days.

(21) Appl. No.: 12/556,587

(22) Filed: Sep. 10, 2009

(65) Prior Publication Data

US 2011/0060727 A1    Mar. 10, 2011

(51) Int. Cl.
*G06F 7/00* (2006.01)
*G06F 17/30* (2006.01)

(52) U.S. Cl.
USPC ........... 707/791; 707/734; 707/738; 715/734; 715/738

(58) Field of Classification Search
None
See application file for complete search history.

(56) References Cited

U.S. PATENT DOCUMENTS

| | | | |
|---|---|---|---|
| 5,937,160 A | 8/1999 | Davis et al. | |
| 6,038,601 A * | 3/2000 | Lambert et al. | 709/226 |
| 6,297,819 B1 * | 10/2001 | Furst | 715/733 |
| 6,496,849 B1 | 12/2002 | Hanson et al. | |
| 6,591,266 B1 * | 7/2003 | Li et al. | 1/1 |
| 6,665,659 B1 * | 12/2003 | Logan | 1/1 |
| 6,757,708 B1 | 6/2004 | Craig et al. | |
| 7,031,968 B2 * | 4/2006 | Kremer et al. | 707/706 |
| 7,266,826 B2 | 9/2007 | Katiyar et al. | |
| 7,627,565 B2 * | 12/2009 | Budzik et al. | 1/1 |
| 2002/0049738 A1 * | 4/2002 | Epstein | 707/1 |
| 2002/0120506 A1 * | 8/2002 | Hagen | 705/14 |
| 2002/0120697 A1 * | 8/2002 | Generous et al. | 709/206 |
| 2003/0106022 A1 | 6/2003 | Goodacre et al. | |
| 2005/0171863 A1 * | 8/2005 | Hagen | 705/26 |
| 2007/0240037 A1 | 10/2007 | Law-How-Hung et al. | |
| 2007/0250781 A1 | 10/2007 | Dolph | |
| 2007/0255754 A1 * | 11/2007 | Gheel | 707/104.1 |
| 2008/0040425 A1 | 2/2008 | Hines | |
| 2008/0154903 A1 | 6/2008 | Crowley et al. | |
| 2008/0235123 A1 * | 9/2008 | Olliphant et al. | 705/35 |
| 2009/0119329 A1 | 5/2009 | Kwon et al. | |
| 2009/0164778 A1 * | 6/2009 | Chaudhry | 713/159 |

OTHER PUBLICATIONS

Curtis Dyreson, Hui-Ling Lin, and Yingxia Wang, "Managing Versions of Web Documents in a Transaction-time Web Server", May 17-22, 2004; ACM 1-58113-844-X/04/0005, pp. 422-432.*
"META Element", "http://en.wikipedia.org/wiki/Meta_element", Downloaded Circa: Aug. 7, 2009, pp. 1-5.
"Expires META Tag", "http://www.submitcorner.com/Guide/Meta/expires.shtml", Dated: Copyright 2000-2009, pp. 1-2.
"Dynamic Caching", "http://publib.boulder.ibm.com/infocenter/wchelp/v6r0m0/index.jsp", Dated: Dec. 18, 2008, pp. 1-2.

* cited by examiner

*Primary Examiner* — Angelica Ruiz
(74) *Attorney, Agent, or Firm* — Narendra Reddy Thappeta

(57) ABSTRACT

Information indicating a time of validity of content of a web page is maintained as meta data within the page itself. A content server, in response to receipt of a request for the web page, determines whether web page has expired. If the content is determined not to have expired, the content server forwards the web page to the requesting user without modification. However, if the content is determined to have expired, the content server adds a warning tag in the content section of the page specifying that the content has expired, and then forwards the page to the requesting user, thereby alert the user of the expiry. In addition, the content server may obtain an updated web page, which may then be provided in response to future requests for the web page.

18 Claims, 9 Drawing Sheets

| Web Page ID | Contact Information | Expiry Date | Mail Sent Date |
|---|---|---|---|
| /var/www/.../staticpage.html | aaa@bbb.com | September 1, 2009 | September 14, 2009 |
| ... | ... | ... | ... |

HANDLING OF EXPIRED WEB PAGES

BACKGROUND OF THE INVENTION

1. Technical Field

The present disclosure relates to web technology and more specifically to handling of expired web pages.

2. Related Art

Web pages generally refer to electronic data, which when rendered using a web browser reproduces the content of the web pages. In a common scenario, a user accesses web pages using a web browser connected to the Internet, and views the corresponding content. Content of a web page generally refers to text, images, etc, that are displayed on a browser screen when the web page is accessed. The manner in which the content is displayed is often controlled by various other attributes present in the web page, as is also well known in the relevant arts.

A static web page refers to a web page that has content which does not generally change, i.e., which is static. Thus, a static web page normally provides identical content in response to all requests from various users. Typically such static web pages are stored in a secondary storage medium connected to a web server (or on a file system where the web server is residing), and are provided "as is" to a user, i.e., by simple retrieval and transmittal. Some examples of static web pages are web pages created according to HTML (hypertext markup language) format. Often, XML type static content is retrieved and incorporated from another file also, before sending a static web page, as is also well known in the relevant arts.

In contrast, a web page that is provided to a requesting user with at least a portion of the content being customized or dynamically created/formed (on reception of the request for the web page) is termed a dynamic web page. Dynamic creation implies that the data is formed by some computations (contrasted with mere retrieval of pre-existing data, in case of static content). The customization may be performed by execution or operation of a corresponding application. Some examples of dynamic web pages are those in which the content is created dynamically during runtime by ASP (active server pages) and JSP (Java server pages) technologies.

The contents of a static web page may become invalid or have reduced relevance/significance (in other words expire) with the passage of time and/or other circumstances/events. For example, the content in a technical blog (weblog) may become at least partially obsolete or invalid as technology evolves with time. In such scenarios, corresponding action may need to be taken to address the expiry of the content of the static web page (e.g., update the content).

Several aspects of the present invention address handling of such content expiry in static web pages.

BRIEF DESCRIPTION OF THE DRAWINGS

Example embodiments of the present invention will be described with reference to the accompanying drawings briefly described below.

FIG. 6B is a diagram illustrating a table maintained in a web server in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A web server provided according to an aspect of the present invention stores a time of validity of web pages, and determines if a web page requested by a client system is valid or not based on the corresponding time of validity. An appropriate action is taken in case the web page is determined not to be valid.

In an embodiment, the time of validity is stored as a meta data of a static web page, and the time of validity represents a time point (date) on which the content of the static web page expires. The web server inserts a warning tag into the static web page prior to serving the modified web page such that the user at a client system is warned of the content expiry.

According to another aspect of the present invention, a web server notifies an author (or other responsible person) when a web page is determined to have expired. When updated information is received from the author, the web server updates the static web page (or static portion of the dynamic web page).

According to yet another aspect of the present invention, the validity of dynamic web pages is also checked when the web page is being accessed.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
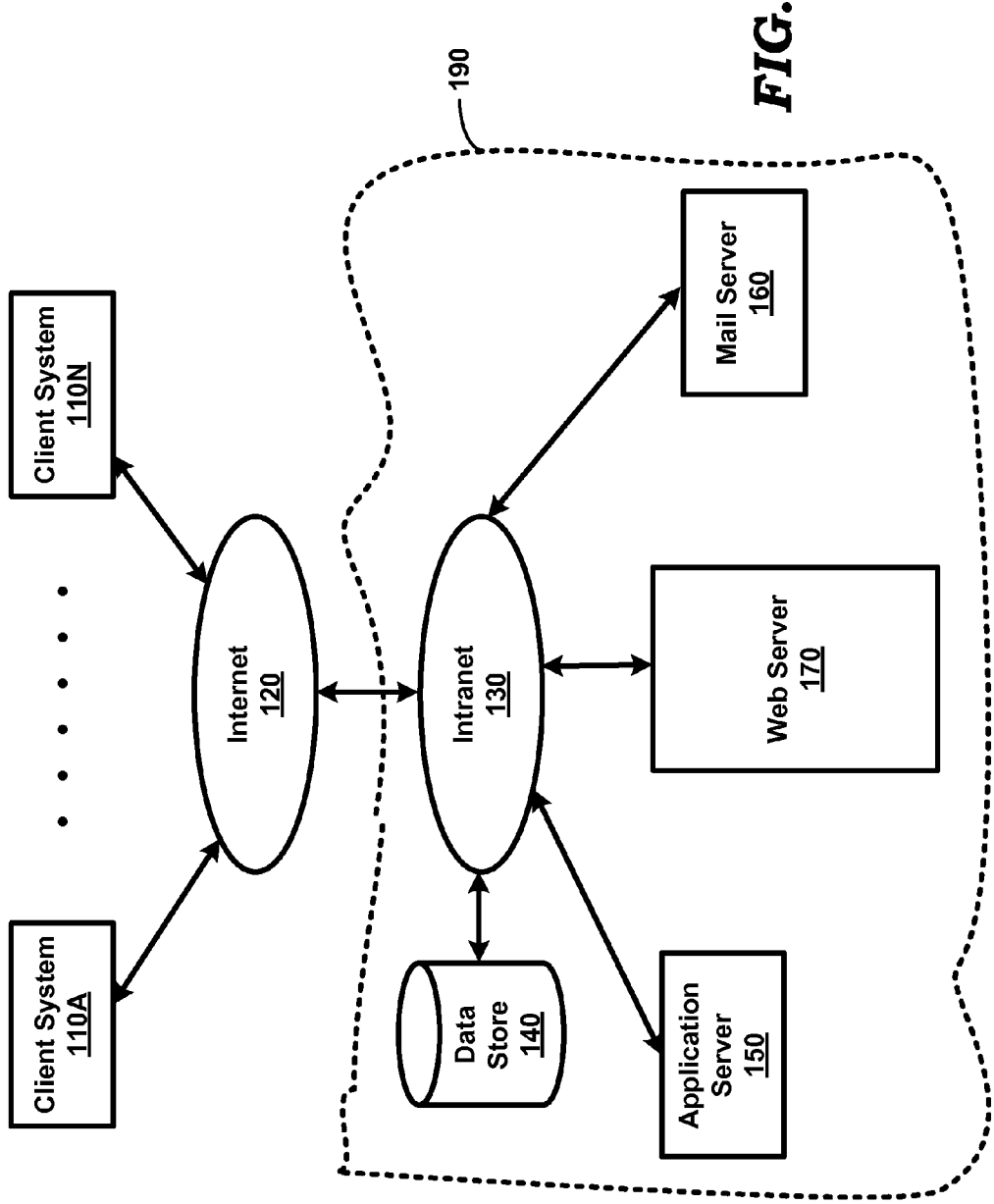
FIG. 1 is a block diagram illustrating an example environment in which several aspects of the present invention can be implemented.

FIG. 1 is a block diagram illustrating an example environment (computing system) in which several aspects of the present invention can be implemented. The computing system is shown containing client systems 110A-110N, Internet 120, intranet 130, data store 140, application server 150, mail server 160 and web server 170.

Merely for illustration, only representative number/type of systems is shown in the Figure. Many environments often contain many more systems, both in number and type, depending on the purpose for which the environment is designed. Each block of FIG. 1 is described below in further detail.

Intranet 130 represents a network providing connectivity between data store 140, application server 150, mail server 160 and web server 170, all provided within an enterprise 190 (shown with dotted boundaries). Internet 120 extends the connectivity of these (and other systems of the enterprise) with external systems such as client systems 110A-110N.

Each of intranet 130 and Internet 120 may be implemented using protocols such as Internet Protocol (IP) well known in the relevant arts. In general, in IP environments, an IP packet is used as a basic unit of transport, with the source address being set (in the originating system) to the IP address assigned to the source system from which the packet originates and the destination address set to the IP address of the target system to which the packet is to be eventually delivered.

Data store 140 represents a non-volatile storage facilitating storage and retrieval of static web pages by web server 170, and may be implemented to include a file system. Data store 140 may also facilitate retrieval and storage of templates for incorporation of dynamic content by one or more (enterprise) applications executing in application server 150 (typically while processing various client requests). Mail server 160 facilitates sending of email messages. In an embodiment, mail server 160 is implemented as an SMTP server.

Each of client systems 110A-110N represents a system such as a personal computer, workstation, mobile station, etc., that generate client requests directed to web server 170 for web pages and/or enterprise applications executing in application server 150. In an embodiment, the requests are generated in HTTP (Hyper Text Transfer Protocol) format and may be generated by applications, such as a web browser, executing in the client system (in response to a user interaction).

Each HTTP request contains data, usually in the form of a universal resource locator/indicator (URL/URI). As noted in RFC 2616, the URL/URI identifies a host (by a name or IP address), a TCP/UDP (Transmission Control Protocol/User Datagram Protocol) port number (default 80), and optional parameters. The application listening at the port number processes the parameters. The resource specified by the URL is deemed to be at the server/application listening on the port.

It may be appreciated that the requests originating (based on source IP address) from a client system are directed to web server 170, implying that the packets are destined to the web server (e.g., based on the destination IP address). The packet may be processed by various intermediate systems such as routers before the packet is delivered to the web server.

Application server 150 generates/forms dynamic web pages upon receiving a corresponding request from web server 170 and sends the web page to the client system from which the request originated. For example, a request (directed to web server 170) from a client system for a dynamic web page, may be forwarded by web server 170 to application server 150. In response, application server 150 may construct and send the dynamic webpage as a response to the client system (via intranet 130 and internet 120).

Application server 150 may also receive requests from client systems (and via web server 170) for static web pages, and in response retrieve the requested static web pages from data store 140, and provide the static web pages to the requesting client system. Application server 150 may also contain other software programs such as operating system, device drivers, etc., (not shown) that provide a (common) run time environment facilitating the execution of the enterprise applications. In an embodiment, application server 150 contains one or more J2EE containers.

Web server 170 processes requests for web pages received from various client systems 110A-110N. Configuration data is generally maintained to indicate the manner in which each type (e.g., JSP, DO) of request is to be processed, and the manner of processing is typically different in case of dynamic versus static pages. In case of some types of requests for dynamic web pages, web server 170 may forward the request (for example, the complete URL) to application server 150, which in turn processes the request, and provides the dynamic web page directly to the requesting client system as noted above. In the case of some other types of dynamic web pages, web server 170 may form the dynamic content, incorporate it into a template and serve the resulting web page.

Assuming a static web page is requested, web server 170 may retrieve the requested static web page from data store 140, and provide the static web page to the requesting client system. Some examples of web servers include Apache Server, Microsoft's Internet Information Server (IIS), etc.

It should be appreciated that web server is an example of a content server which responds to requests for web pages. However, some features of the present invention can be implemented in other content servers as well. For example, a network cache (part of internet 120 or Intranet 130) may store previously served web pages and respond to requests for the web pages even though the request is not directed to (since destination IP address would equal that of the web server 170) the network cache.

As noted above, the content of some of the web pages may expire. Various aspects of the present invention enable appropriate handling of such content expiry in static web pages, as described in sections below.

3. Handling a Request for a Static Web Page

Figure 2:
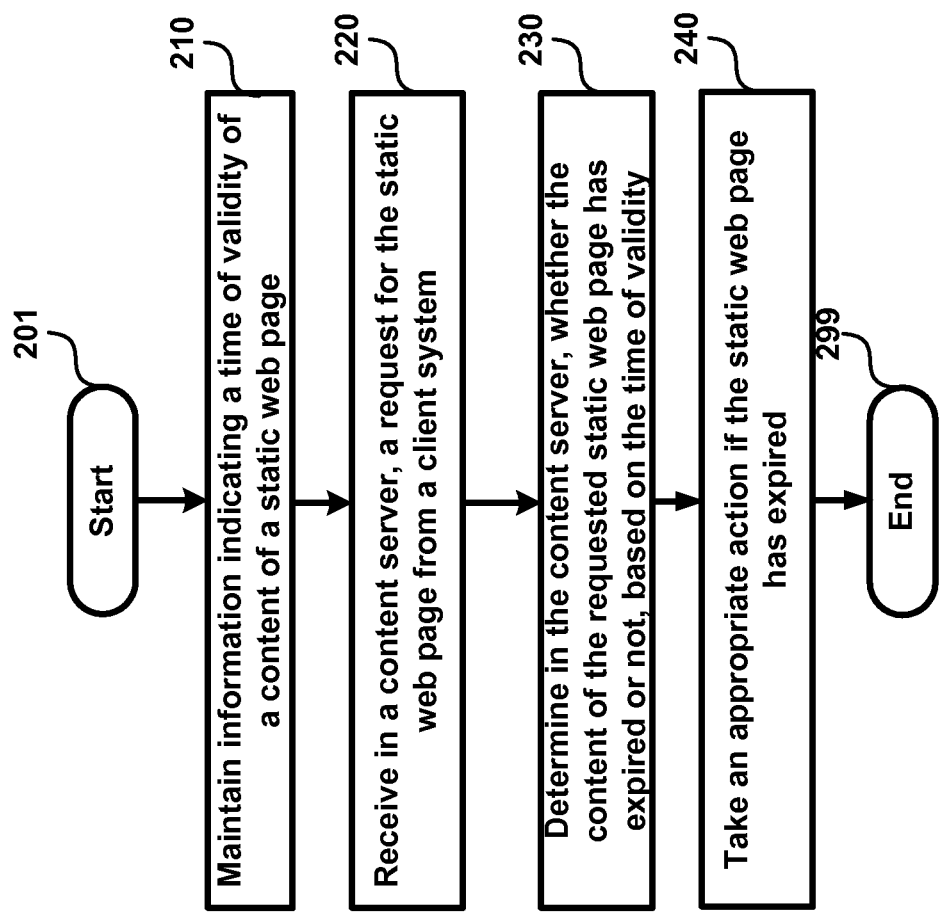
FIG. 2 is a flowchart illustrating the manner in which a request for a static web page is handled in an embodiment of the present invention.

FIG. 2 is a flowchart illustrating the manner in which a request for a static web page is handled in an embodiment of the present invention. The flowchart is described with respect to FIG. 1, and in relation to web server 170 merely for illustration. However, the features can be implemented in other environments (and in other servers) also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, web server 170 maintains information indicating a time of validity of a content of a static web page. In an embodiment of the present invention, such information is stored within the static web page itself (in data store 140). However in other embodiments, the information may be stored elsewhere (e.g., in an external database). Control then passes to step 220.

In step 220, web server 170 (which may be viewed in general as a content server) receives a request for the static web page from a client system. The request packet for the static web page is "directed" to web server 170, i.e., the destination address of the request packet is set to the IP address of web server 170. Control then passes to 230.

In step 230, web server 170 determines whether the content of the requested static web page has expired or not (i.e., whether the web page requested by a client system is valid or not), based on the time of validity (noted as maintained in step 210). For example, assuming that the validity is expressed in terms of an expiry date, the present date (i.e., date on the day the request is being processed) may be compared with the expiry date to determine whether the content is valid or expired.

Web server 170 may similarly maintain information specifying the times of validity of other static web pages, and on receiving a request for a corresponding static web page, determines whether the content of the static web page has expired or not based on the information maintained. In case the content has not expired, web server 170 may send/serve the requested web page to the requesting client system. Control then passes to step 240.

In step 240, web server 170 takes an appropriate action if the static web page (i.e., its content) has expired. It should be appreciated that the action is distinct from serving the web page. As an example, assuming that web server 170 determines that the contents of a requested static web page have expired, web server 170 may choose to (based on the specific manner in which it is programmed/designed) provide the static web page which when displayed by a browser (i.e., rendered) in the client system that requested for the static web page, displays a message indicating that the contents of the web page have expired.

Alternatively, web server 170 may be programmed not to return the web page at all, and only return a message specifying that the requested web page is no longer valid. For example, web server 170 may return a page with a predefined message, or respond with HTTP 1.x/204 No Content, or an HTTP 1.x/200 OK message. Various other alternative approaches can be implemented based on other status codes provided by the HTTP protocol. Control then passes to step 299, in which the flowchart ends.

Web server 170 may also perform additional actions in response to a request for a web page with expired contents, some of which are described in sections below. However, first, the manner in which information indicating a time of validity of a content of a static web page is maintained in an embodiment of the present invention is illustrated next.

4. Specifying Content Expiry of a Static Web Page

Figure 3A:
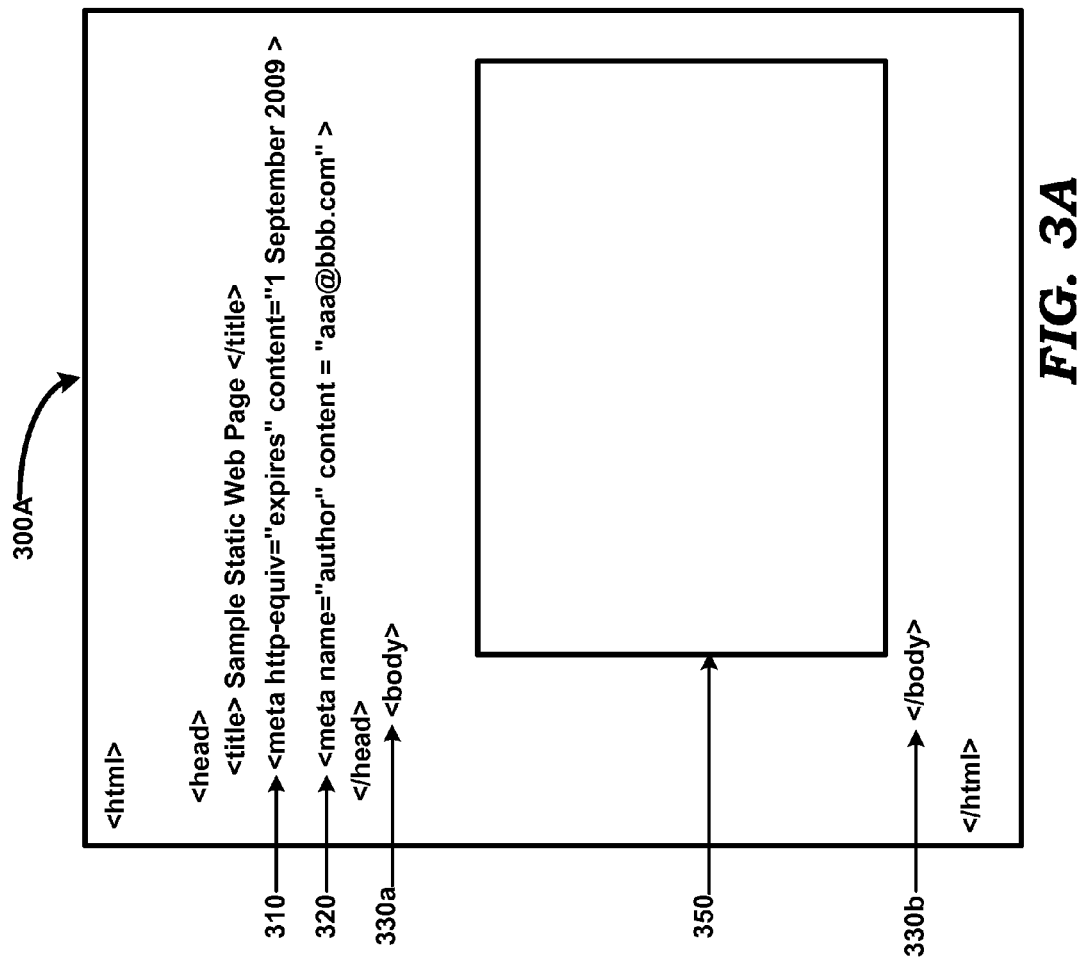
FIG. 3A is a diagram depicting the details of a static web page in an embodiment of the present invention.

FIG. 3A is a diagram depicting the details of a static web page (page 300A) in an embodiment of the present invention. The details of FIG. 3A are shown merely by way of illustration, and may be different in other embodiments. Static web page 300A (assumed named 'staticpage.html') may be created (by an author) according to the HTML format and stored in data store 140. Static web page 300A is shown containing various HTML tags. Broadly, there are shown a 'head' portion and then a body portion. The body portion is rendered in the web page on the client system and each tag in the header portion is deemed a property of the entire document.

Line 310 contains a meta-tag, which constitutes meta data specifying that the time of validity of the contents of static web page 300A is till 1 Sep. 2009 (date of expiry). Line 320 contains another meta-tag representing a contact address (email address/contact information shown in the Figure as "aaa@bbb.com") of the author of static webpage 300A.

The contents (which are rendered at the client system) of HTML page 300A are specified in a 'content section' represented by box 350, contained within the 'body' tags, marked in the Figure by 330a and 330b. Content section 350 may contain corresponding HTML code/tags which when processed by a web browser enable the static web page to be displayed on a screen.

Upon receiving a request for static web page 300A (for example, from any of client systems 110A-110N), web server 170 retrieves static web page 300A from data store 140, and checks the time of validity (as specified in line 310) of the contents of HTML page 300A by comparing the 'valid up to' date (1 Sep. 2009, in the example of FIG. 3A) with the 'date of request' (e.g., the date on which the request for HTML page 300 is received). The date of request ('current time') may be obtained, for example, from hardware components (such as real-time clocks) within web server 170. In other embodiments, web server 170 may check the time of validity of a static web page even prior to receipt of a request for the web page, and maintain a table (for example, stored in data store 140) specifying whether the contents of corresponding static web pages have expired or not.

Continuing with FIG. 3A, assuming the date of request (e.g., Jan. 15, 2009) of page 300A is prior to (or the same as) the time of validity (1 Sep. 2009, as specified in line 310), web server 170 forwards page 300A to the requesting client system, without any modifications to page 300A. A browser contained in the requesting client system may then parse the tags of received page 300A, and cause page 300A to be displayed/rendered on a screen, in a known way.

Figure 3B:
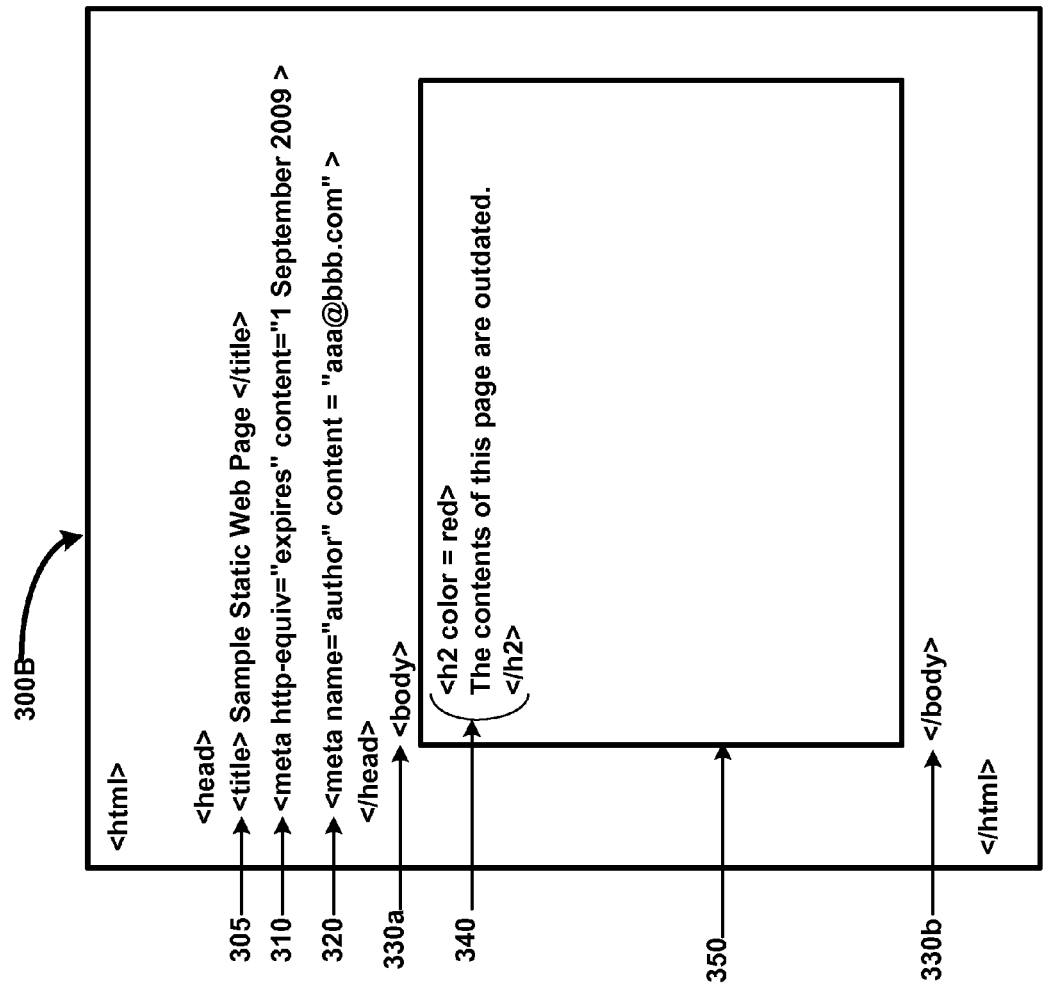
FIG. 3B is a diagram depicting the details of a modified static web page served to a client system when the static web page is no longer valid, in an embodiment of the present invention.

On the other hand, assuming the date of request (e.g., Dec. 15, 2009) of page 300A is later than the time of validity (1 Sep. 2009), web server 170 inserts a message (a warning tag) within page 300A specifying that the contents of the page are outdated. Page 300B of FIG. 3B illustrates page 300A of FIG. 3A after the insertion of the 'warning tag', which may be viewed as additional content within the content section 350. In the example shown in FIG. 3B, the insertion is indicated by the block of lines 340, as reproduced below:

<h2 color=red>
The contents of this page are outdated.
</h2>

Web server 170 then forwards page 300B to the requesting client system. The insertion of the warning tag noted above, causes a web browser at the requesting client system to display the text "The contents of this page are outdated." at the client system (in addition to other content in content section 350), thereby alerting a user that the contents of the page have expired. The above-noted insertion is provided merely by way of example.

However, other text/warning tags (as well as the manner in which the text is to be displayed, such as for example, font, color, position of display, scrolling text (marquee), etc.) may instead be specified as well, using corresponding HTML tags, as will be apparent to one skilled in the relevant arts on reading the disclosure herein. In an embodiment, a Java script is inserted in place of code in block 340 to cause the message (warning tag) to be displayed in a message pop-up box. In another embodiment, java script is inserted in place of code in block 340 to cause the message (warning tag) to be displayed as a scrolling text.

Figure 4:
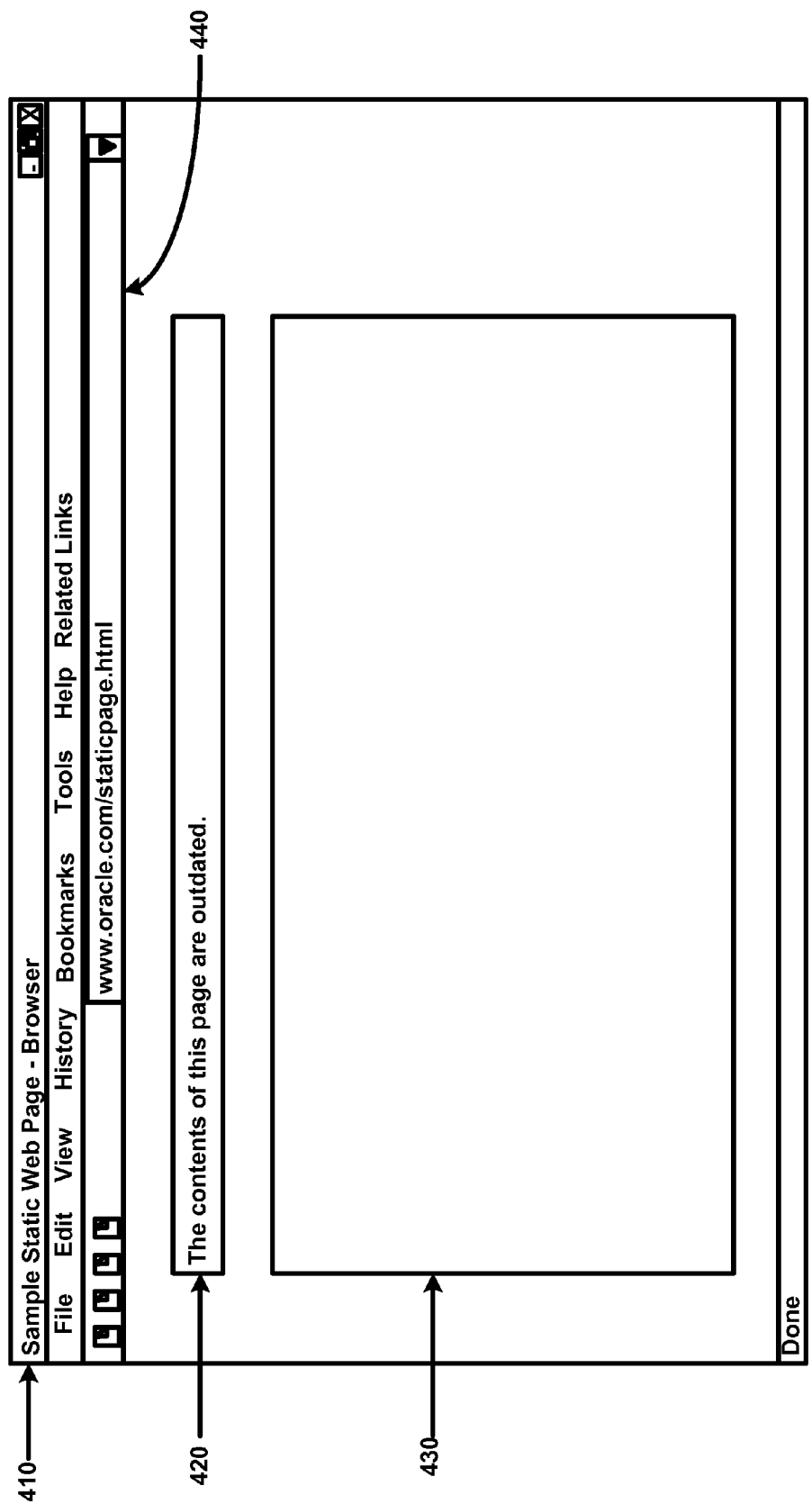
FIG. 4 is a view of a modified static web page when displayed (rendered) on a screen, in an embodiment of the present invention.

FIG. 4 is an example illustration of how web page 300B may appear when displayed on a display screen (CRT monitor/LCD, etc) at the requesting client system. Marker 420 indicates the message corresponding to the code in block 340 of FIG. 3B. Box 430 represents the area of the screen which displays content specified in block 350 of FIG. 3B/3A. Marker 410 indicates the title of the web page, corresponding to the code in line 305 of FIG. 3B. Address bar 440 displays the URL at which web page 300B is accessible.

Thus, according to an aspect of the present invention, a web server determines whether the contents of a requested static webpage have expired or not. In an embodiment, the time of validity of the web page is included as meta data (in a meta tag) in the static webpage itself, enabling a web server to make the above determination.

If the contents are determined not to have expired, the web server forwards the static web page without modification to the requesting client system. On the other hand, if the contents are determined to have expired, the web server (using a plug-in) inserts a message specifying that the contents have expired, and then forwards the web page to the requesting client.

On determination that the contents of a requested static web page have expired, web server 170 may initiate further actions to address the expiry of the web page, as described next.

5. Updating of Content of a Static Web Page

Figure 5:
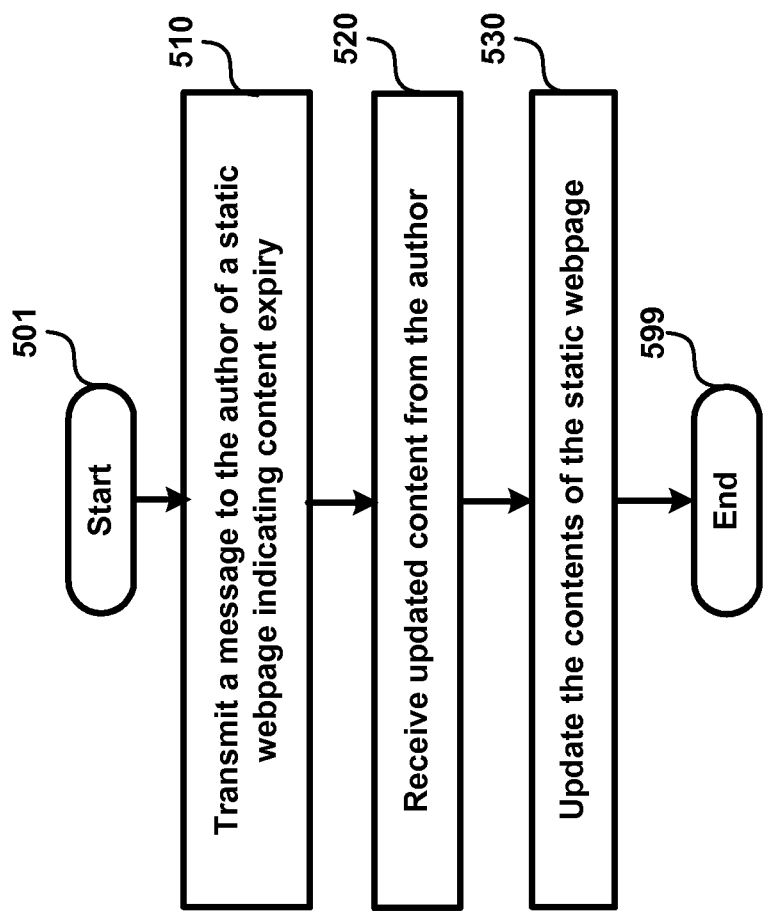
FIG. 5 is a flowchart illustrating the manner in which content of a static web page is updated in an embodiment of the present invention.

FIG. 5 is a flowchart illustrating the manner in which updating of content of a static web page is performed in an embodiment of the present invention. The flowchart is described with respect to the components of FIG. 1, merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 501, in which control immediately passes to step 510.

In step 510, web server 170 transmits a message (e.g., as email-electronic mail) to the author of a static webpage (whose contents are determined to have expired) indicating content expiry. In an embodiment of the present invention, web server 170 provides the contact address (e.g., email address shown as aaa@bbb.com in line 320 of FIGS. 3A and 3B) of the author of the static web page (contained within the static web page itself, as indicated by marker 320 in FIGS. 3A and 3B) as well as the text of the email (indicating content expiry) to mail server 160 with instructions to generate and send a corresponding email to the author informing the author of the content expiry. The email may be sent from an email address of an administrator of web server 170. The operations of step 510 may be completely automated, requiring no manual/administrator intervention. Control then passes to step 520.

In step 520, web server 170 (or administrator of web server 170) receives updated content in a reply email from the author (via mail server 160), in response to the operation of step 510. The author may choose to send updated content only for those portions for the static web page that have expired. Alternatively, the author may send a complete replacement web page with the relevant portions of the contents updated. In an embodiment, the updated content is received as an attachment to an email sent by the author addressed to an administrator of web server 170. The author may also specify the expiry date of the updated content in the email. Alternatively, the expiry date of the updated content may be specified as a meta-tag in the updated (replacement) web page (if being sent as such). Control then passes to step 530.

In step 530, the administrator of web server 170 updates the contents of the static webpage based on the updated content received in step 520. Such updating may be performed manually by the administrator, for example, by replacing expired portions of the static web page by the corresponding updated content received from the author. Alternatively, the administrator may replace the static web page with expired contents by the replacement static web page with updated contents received from the author in step 520. The administrator may store the updated static web page in data store 140. Control then passes to step 599, in which the flowchart ends.

In response to any future requests for staticpage.html (300A) from any of client systems 110A-110N, web server 170 retrieves the updated static web page stored in data store 140 (in step 530 above), and provides the updated page (along with a new expiry date specified by the author) to the client system. Web server 170 may additionally also perform the operations of flowchart of FIG. 2, to determine whether the contents of the updated web page is valid (expired or not).

The features described above with respect to the flowchart of FIG. 5 are merely illustrative, and various other approaches and/or extension/variants of the approach described above will be apparent to one skilled in the relevant arts by reading the disclosure provided herein. For example, in an alternative embodiment, web server 170 sends an email to the author of an expired static web page only if the static web page continues to be accessed by client systems (i.e., not merely upon determination that the contents of the web page have expired). In another embodiment, web server 170 may send an email to the author of an expired static web page only if the request rate for the web page is greater than a specified pre-configured threshold, for example, 5 requests per day.

In another embodiment, web server 170 may send the expired web page as an attachment to the email sent to the author of the expired web paged. In yet another embodiment, the updating is not done by the administrator of web server 170, and instead the updating is automated, as described in sections below with an example.

Thus, the features of the present invention enable a web server to determine expiry of contents of a static web page, alert a requesting user of expiry (if any), and obtain an updated web page, which may then be served for future requests of the web page.

Although in the examples described above, the contact address of the author of the static webpage is noted as being 'embedded' in the webpage itself, in other approaches, the contact address may be stored in data store 140. When an email has to be sent to the author, web server 170 retrieves the contact address from data store 140 prior to sending the corresponding email to the author. Storing the contact address in data store 140 rather than in the web page itself may help prevent spammers from obtaining the contact address. A table containing web page URLs and the contact addresses of the corresponding authors may be maintained for all static pages stored in data store 140 and provided by web server 170.

The internal details of web server 170 in an embodiment of the present invention are described next.

6. Web Server

Figure 6A:
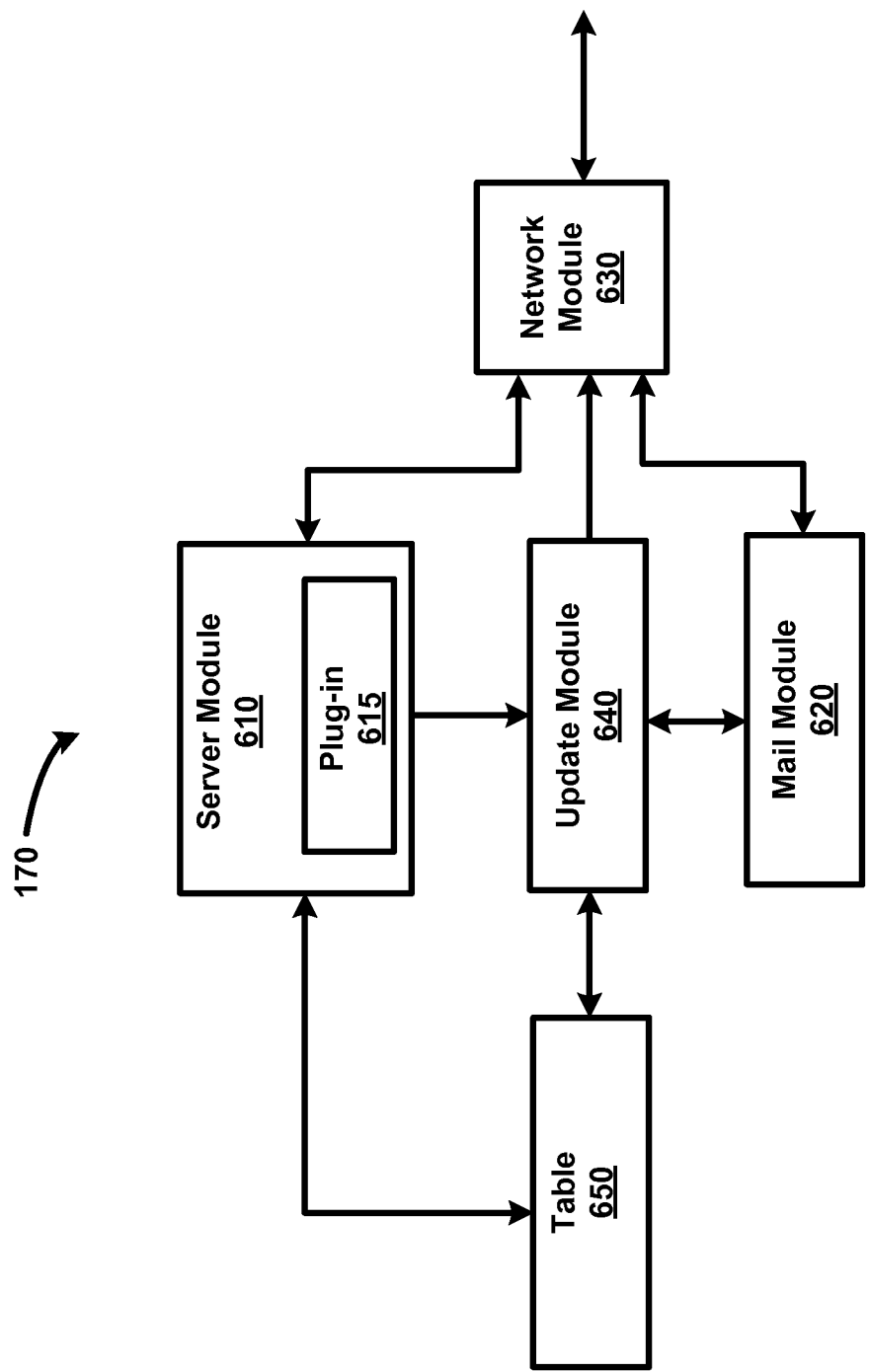
FIG. 6A is a block diagram illustrating the internal details of a web server in an embodiment of the present invention.

FIG. 6A is a block diagram illustrating the various internal blocks of a web server, in an embodiment of the present invention. Web server 170 is shown containing server module 610 (including plug-in 615), mail module 620, table 650, network module 630, and update module 640.

Network module 630 provides various communication routine/utilities (e.g., network protocol stacks, etc.) to enable communication to a network (e.g., to intranet 130 and internet 120 using Internet Protocol), as well as with other systems connected to the network(s). Network module 630 operates in conjunction with network interface 780 (described below) to provide communication with external systems.

Server module 610 contains code/routines/for processing requests for web pages received from various client systems. Server module 610 (and plug-in 615) may receive requests for web pages via network module 630.

Plug-in 615 represents custom code/routines that are added to (or interfaced with) the code/routines of server module 610 to enhance the features provided by server module 610. In an embodiment of the present invention, the features described above with respect to FIG. 2 are implemented by plug-in 615. Plug-in module 615 may cause notifications of invalid content, etc., to be provided as a part of the served web pages, as described above. Plug-in module 615 notifies update module 640 of web pages whose content have been determined to have expired.

Update module 640 stores in table 650 identifiers/names of web pages (plus related information, as described below with respect to table 650) whose contents have expired and are awaiting update. Update module 640 instructs mail module 620 to send email messages to authors (or otherwise the responsible person) of web pages with expired contents, and receives via mail module 620 the updated web pages (or updated portions of the web pages). Update module 640 updates the corresponding web page with the received updates (or replacement page), and deletes the entries for the web page entered earlier in table 650. Thus, the content of web pages can be updated automatically (without manual intervention of administrators, etc.).

Table 650 (illustrated in greater detail in FIG. 6B) depicts the web pages sought to be replaced at a present time instance (i.e., the web pages that are identified as being required to be updated and the update not yet being complete), and is shown containing four columns. The first column may store web page identifiers (e.g., /var/www/.../staticpage.html) specifying the storage location (directory and path from a root directory in a file system) of the web page sought to be replaced.

The second column stores the contact addresses (e.g., aaa@bbb.com) of the authors (or other responsible person for the web page content), who have been notified of the need to update the content. The third column stores the expiry date (e.g., 1 Sep. 2009) of the corresponding web page (which may have been retrieved earlier from the corresponding meta-tag field related to the web page). The fourth column may store the dates (e.g., Sep. 14, 2009) on which a message/email was sent to the author of the (corresponding) web page notifying the author of the content expiry. This date may correspond to the time at which the specific retrieval which caused the content expiry (page validity) to be checked earlier. The presence of a row in table 650 thus indicates that the content has been determined to be no longer valid.

Mail module 620 is used to send notifications of content invalidity to the authors (or other responsible person), and also receives updates to web pages (sent by author/s of the web page, as noted above). The update can be in the form of a new/updated web page via network module 630 or only the specific data content (representing the updated information) according to any pre-specified convention. Mail module 620 forwards the updates to update module 640, which then updates the content in the secondary storage and removes the entry from table 650.

While the approaches above were described with respect to handling content expiry in static web pages, similar approaches (with suitable modifications) can be applied to handle content expiry in dynamic web pages as well, as described below.

7. Dynamic Web Pages

According to an aspect of the present invention, the features described above are extended to dynamic web pages as well. For example, an administrator may decide up to what future date the dynamic web page is valid and when a request to serve the dynamic web page is received, web server 170 may decide whether the web page is valid (similar to with respect to static web pages, as described above). The web server may insert a warning tag in case the web page is no longer valid (i.e., the current/present date is after the future date noted above) or decide not to serve the web page (based on user configuration, which can be part of the meta tags).

In an embodiment, static forms/templates used in web server 170 for forming dynamic web pages (wherein the dynamic content is generated by applications executing in application server 150) may also include a time of validity or expiry, and accordingly the approaches of above may be implemented for handling content expiry in dynamic web pages as well.

Web server 170 (as well as application server 150 and mail server 160) of FIG. 1 can be implemented in various embodiments as a desired combination of one or more of hardware, executable modules, and firmware. The description is continued with respect to an embodiment in which various features are operative when the software instructions described above are executed.

8. Digital Processing System

Figure 7:
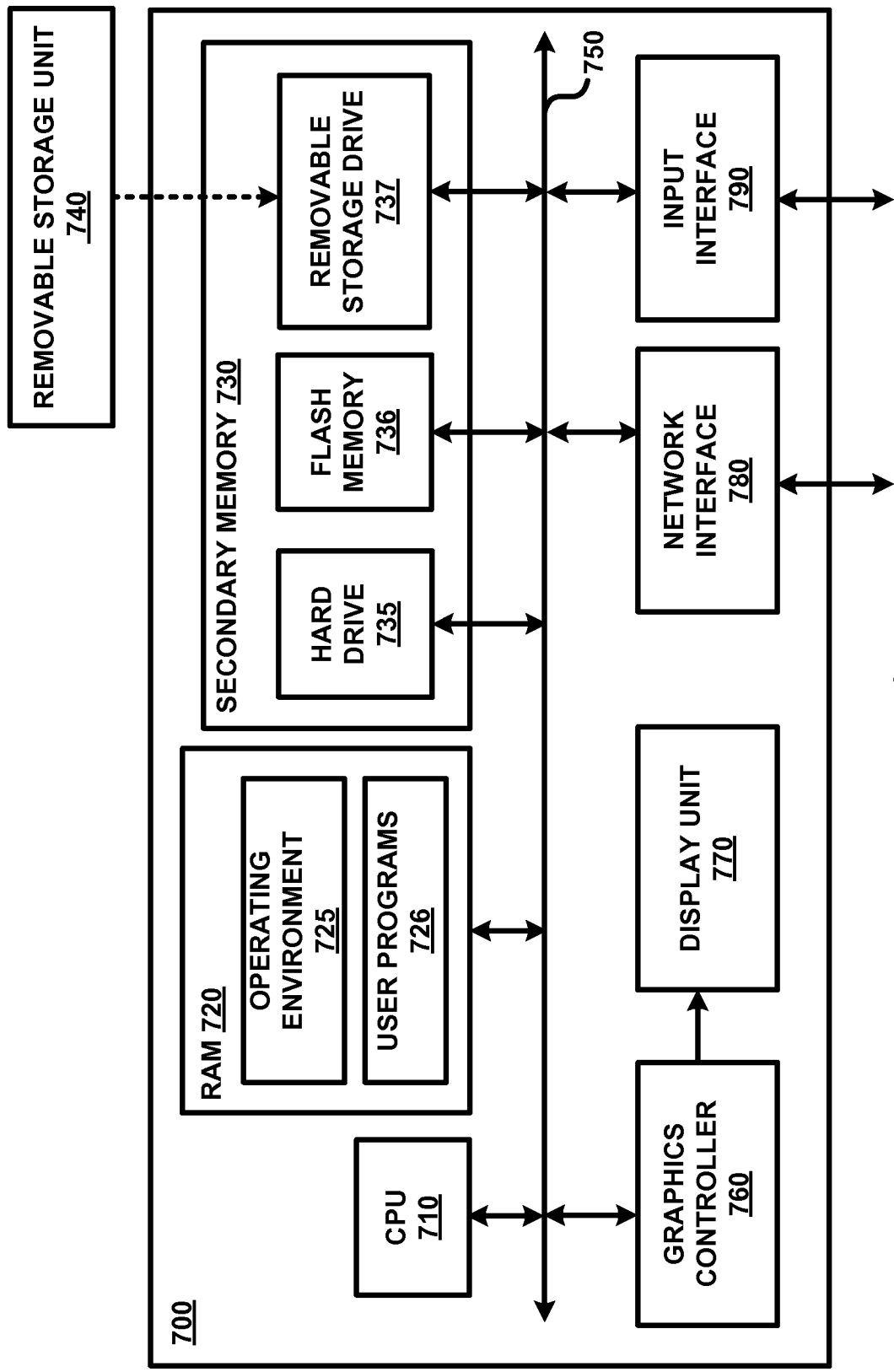
FIG. 7 is a block diagram illustrating the details of digital processing system in which several aspects of the present invention are operative by execution of appropriate software instructions.

FIG. 7 is a block diagram illustrating the details of digital processing system 700 in which various aspects of the present invention are operative by execution of appropriate execution modules. Digital processing system 700 may correspond to web server 170 (as well as application server 150 and mail server 160).

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. The instructions may include those contained in server module 610 and plug-in 615 of FIG. 6. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting operating environment 725 and/or user programs 726 (such as web server applications processing user requests for serving web pages, etc.). The operating environment contains utilities shared by user programs, and such shared utilities include operating system, device drivers, virtual machines, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity (by appropriate physical, electrical, and other protocol interfaces) to a network (e.g., to intranet 130 and internet 120 using Internet Protocol), and may be used to communicate with other systems connected to the network (for example, as shown in FIG. 1).

Secondary memory 730 may contain hard drive 735, flash memory 736, and removable storage drive 737. Secondary memory 730 may store data and software instructions, which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures, modules and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of serving content on a network, said method comprising:

maintaining information indicating a time of validity of a static web page, wherein said static web page has a content, wherein said time of validity comprises a date of expiry of said content;

receiving in a web server, a request for said static web page from a client system, said request being directed to said web server;

determining in said web server, whether said content of said static web page is valid based on said time of validity, wherein said determining comprises comparing a current time with said date of expiry, said static web page being determined as not being valid if said current time is later than said date of expiry, wherein said determining is performed in response to receiving said request;

if said content is determined as being valid, sending said static web page, including said content, to said client system as a response to said request, else, sending additional content along with said content of said static web page to said client system as said response to said request, wherein said additional content causes display of a message indicating that the content of said static web page is not valid, on said client system when said content of said static web page is displayed on said client system as a response to said request for said static web page.

2. The method of claim 1, wherein said maintaining comprises:

storing said date of expiry as a tag in a meta-data in said static web page on a secondary storage; and in response to receiving said request, retrieving said static web page from said secondary storage before sending said static web page to said client system.

3. The method of claim 2, further comprising:

if said content is determined as not being valid, inserting into a content section of said static web page, a warning tag which causes display of a message indicating that said content has expired, on said client system when display of said static web page with expired content is sought on said client system.

4. The method of claim 3, wherein said static web page is in the form of Hypertext Markup Language (HTML), wherein said request is received in the form of Hypertext Transfer Protocol (HTTP), and wherein said warning tag comprises one of a pop-up message and a scrolling message, whereby said one of said pop-up message and said scrolling message is displayed on said client system when said static web page with expired content is displayed on said client system.

5. The method of claim 2, wherein said maintained information further comprises a contact information of a person responsible for said content, said method further comprising:

notifying said person, using said contact information, that said content has expired if said content is determined to have expired.

6. The method of claim 5, further comprising:

receiving updated content for said static web page from said person after said notifying;

replacing the expired content with said updated content in said secondary storage;

receiving in said web server, after said replacing, a second request for said static web page from a second client system, said second request being directed to said web server; and sending said updated content in the form of said static web page as a response to said second request such that said updated content is served in response to requests received after said replacing.

7. A non-transitory machine readable medium storing one or more sequences of instructions for causing a content server to serve content on a network, wherein execution of said one or more sequences of instructions by one or more processors contained in said content server causes said content server to perform the actions of:

receiving a request for a static web page from a client system;

retrieving a content of said static web page from a secondary storage, said content having an associated date of expiry;

determining whether said content of said static web page is valid, wherein both of said determining and said retrieving are performed after said receiving, wherein said determining comprises comparing a current time with said date of expiry of said content, said content being determined as not being valid if said current time is later than said date of expiry, and valid otherwise; and if said content is determined as being valid, sending said static web page, including said content, to said client system as a response to said request, else, sending additional content along with said content of said static web page to said client system as said response to said request, wherein said additional content causes display of a message indicating that the content of said static web page is not valid, on said client system when said content of said static web page is displayed on said client system as a response to said request for said static web page.

8. The machine readable medium of claim 7, wherein said static web page retrieved from said secondary storage contains an associated meta-data indicating said date of expiry of said content.

9. The machine readable medium of claim 8, further comprising:

storing said date of expiry as a tag in a meta-data associated with said static web page on said secondary storage, wherein, in response to receiving said request, said retrieving retrieves said static web page from said secondary storage and sends said static web page to said client system.

10. The machine readable medium of claim 9, wherein said additional content is in the form of a warning tag inserted into said content of said static web page, wherein said warning tag causes display of said message indicating that said content has expired.

11. The machine readable medium of claim 10, wherein said static web page is in the form of Hypertext Markup Language (HTML), wherein said request is received in the form of Hypertext Transfer Protocol (HTTP), and wherein said warning tag comprises one of a pop-up message and a scrolling message.

12. The machine readable medium of claim 10, further comprising:

maintaining a contact information of a person responsible for said content, and notifying said person, using said contact information, that said content has expired if said content is determined to have expired.

13. The machine readable medium of claim 12, wherein said content server is a HTTP server.

14. A computing system comprising:

a non-volatile storage to store a static web page and an associated expiry date, said static web page containing a content for rendering on client systems; and a web server to receive a request for said static web page from a client system on a network based on Internet Protocol (IP), and in response, to retrieve said static web page and said associated expiry date from said non-volatile storage, wherein said request is received at a current time, said web server to determine that said content has expired if said current time is after said associated expiry date and not expired otherwise, said web server being addressable by an IP address on said network, wherein said request is directed to said web server in that the request is received from said client system in the form of an IP packet, said IP packet having a destination address set to said IP address of said web server when originating at said client system.

15. The computing system of claim 14, wherein said associated expiry date is stored as a meta-data in said static web page on said non-volatile storage.

16. The computing system of claim 15, wherein if said content is determined to have expired, said web server inserts into a content section of said static web page, a warning tag which causes display of a message indicating that said content has expired on said client system when said static web page with expired content is displayed on said client system.

17. The computing system of claim 16, wherein a contact information of a person responsible for said content is also stored in said static web page, and wherein said web server notifies said person, using said contact information, that said content has expired if said content is determined to have expired.

18. The computing system of claim 17, wherein said web server is further operable to:

receive updated content for said static web page from said person after said notifying;

replace the expired content with said updated content in said non-volatile storage;

receive, after said replacing, a second request for said static web page from a second client system, said second request being directed to said web server; and send said updated content in the form of said static web page as a response to said second request such that said updated content is served in response to requests received after said replacing.

* * * * *